United States Patent [19]

Tajima et al.

[11] Patent Number: 4,674,775

[45] Date of Patent: Jun. 23, 1987

[54] COUPLING FOR CORRUGATED CONDUIT

[75] Inventors: Takashi Tajima, Nara; Kiyokazu Matsumoto, Osaka; Toshio Shibabuchi, Wakayama, all of Japan

[73] Assignee: Osaka Gas Company Limited, Osaka, Japan

[21] Appl. No.: 846,685

[22] Filed: Apr. 1, 1986

[30] Foreign Application Priority Data

Jul. 22, 1985 [JP] Japan .................... 60-112873[U]

[51] Int. Cl.$^4$ .................................... F16L 21/06
[52] U.S. Cl. ............................ 285/330; 285/354; 285/903
[58] Field of Search ............ 285/903, 354, 330, 248, 285/249

[56] References Cited

U.S. PATENT DOCUMENTS

| | | | |
|---|---|---|---|
| 2,077,869 | 4/1937 | Bennett | 285/330 |
| 2,363,586 | 11/1944 | Gaurnaschelli | 285/249 X |
| 3,008,738 | 11/1961 | Longfellow | 285/354 X |
| 3,375,025 | 3/1968 | Engel | 285/248 X |
| 3,711,632 | 1/1973 | Ghirardi | 285/903 X |
| 3,711,633 | 1/1973 | Ghirardi et al. | 285/903 X |
| 3,934,902 | 1/1976 | McNamee | 285/903 X |
| 4,437,691 | 3/1984 | Laney | 285/354 X |
| 4,630,850 | 12/1986 | Saka | 285/903 X |

FOREIGN PATENT DOCUMENTS

| | | | |
|---|---|---|---|
| 1229932 | 12/1966 | Fed. Rep. of Germany | 285/330 |
| 2850927 | 5/1979 | Fed. Rep. of Germany | 285/354 |
| 51-44174 | 10/1976 | Japan | 285/903 |
| 60-73193 | 4/1985 | Japan | |
| 90041 | 1/1959 | Netherlands | 285/330 |

Primary Examiner—Thomas F. Callaghan
Attorney, Agent, or Firm—Armstrong, Nikaido, Marmelstein & Kubovcik

[57] ABSTRACT

An improved coupling for a corrugated conduit includes a main tubular body with a sleeve defining a conduit receiving bore terminating at its inner end in an annular shoulder projecting radially inwardly of the tubular body. A nipple clamps the end portion of the conduit and is inserted together therewith into the conduit receiving bore where it is pressed forwardly by rotating a nut threaded on the sleeve for forcing the end of the conduit into pressing contact with the shoulder. The nipple is externally shaped to have a polygonal configuration so as to be slidably but unrotatably inserted in the correspondingly shaped conduit receiving bore, preventing the conduit from being twisted during the securing operation of rotating the nut about the sleeve.

3 Claims, 8 Drawing Figures

COUPLING FOR CORRUGATED CONDUIT

BACKGROUND OF THE INVENTION

1. Field of the Invention

The present invention is directed to a coupling for a corrugated conduit, and more particularly to such a coupling utilized as an attachment of an end of the corrugated flexible conduit to a device or fitting with which the fluid medium conveyed by the conduit is utilized.

2. Description of the Prior Art

Such couplings for the corrugated conduit or hose have been extensively utilized in gas conveying system as well as in other fluid conveying systems. A typical prior coupling for the corrugated conduit is shown in Japanese unexamined Patent Publication (KOKAI) No. 60-73193 in which the end of a corrugated conduit is clamped by a nipple and is inserted together therewith into a sleeve on one side of a main tubular body. A nut is threaded on the sleeve to have a collar at its end in abutting engagement with the rear end of the nipple for pressing the nipple together with the end of the conduit forwardly into the sleeve, forcing the latter into sealing engagement with an annular shoulder projecting radially inwardly of the tubular body. In this prior coupling, however, the nipple is shaped to have a circular external configuration relatively freely rotatable within the sleeve so that it tends to be rotated by the frictional force developed at the abutment between the nut and the nipple as the nut is rotated on the sleeve in advancing the nipple and the end of the conduit into the sleeve, thereby subjecting the conduit to twisting or kinking forces which would damage the conduit or render the subsequent procedures to be rather inconvenient.

SUMMARY OF THE INVENTION

The present invention has been accomplished in view of the above shortcoming and provides an improved coupling for a corrugated conduit. The coupling in accordance with the present invention comprises a main tubular body having a sleeve at its one end defining therein a conduit receiving bore terminating at its inner end in an annular shoulder projecting radially inwardly of the main tubular body midway between the ends of the axial bore. A nipple is provided for clamping an end portion of the conduit with corrugations of the conduit left projecting beyond the forward end of the nipple and is inserted into the conduit receiving bore of the sleeve together with the end portion of the conduit. A series of serrations are formed interiorly of the nipple to be in registering engagement with the corrugations at the end portion of the conduit for firmly gripping the conduit. The nipple has its rear end abutted against a collar at one end of a nut threadedly fitting about the sleeve to be thereby pressed forwardly into the sleeve in order to force the end of the conduit into pressing engagement with the annular shoulder as the nut being rotated. The characterizing feature of the present invention resides in that the nipple is shaped to have a polygonal exterior configuration to be fitted in a correspondingly shaped section of the conduit receiving bore so as to be slidably but unrotatably inserted in the sleeve. With this result, the nipple and the end portion of the conduit can be pressed into the sleeve without being rotated, obviating the occurrence of twisting or kinking of the conduit while ensuring effective pressing contact between the end of the conduit and the shoulder.

Accordingly, it is a primary object of the present invention to provide a coupling for a corrugated conduit in which the conduit is free from being subjected to twisting or kinking forces at the time of rotating the nut for securing the conduit to the sleeve.

In a preferred embodiment, the nipple is prepared in the form of a split member composed of a pair of semi-cylindrical halves connected by an integral thin-walled hinge portion to be easily separable therefrom. The nipple is in use to be separated into the two halves which are then placed about the end portion of the conduit with the serrations being in registering engagement with the corrugations of the conduit so as to be inserted into the sleeve as clamping the end portion of the conduit. With the use of this split nipple, the corrugations at the end portion of the conduit can be readily brought into registering engagement with the serrations of the nipple so that the end portion of the conduit can be securely and firmly gripped by the nipple.

It is therefore another object of the present invention to provide a coupling for a corrugated conduit in which the end portion of the conduit can be easily and firmly clamped by the separable nipple.

Formed at the juncture of the shoulder and the conduit receiving bore of the sleeve is an annular groove for receiving therein a sealing ring which is to be disposed around the end of the conduit pipe when it is forced into pressing contact with the shoulder. The sealing ring has its side in abutting relation with the forward end of the nipple so that it is compressed axially by the nipple inserted in the sleeve to elastically expand radially for establishing sealing contacts between the sealing ring and the wall of the groove and between the sealing ring and the end of the conduit being pressed against the shoulder. In this sense, the nipple pressed forwardly into the sleeve by the nut can serve not only to guide the end of the conduit into pressing engagement with the shoulder but also to effectively deform the sealing ring for the purpose of providing an increased seal between the conduit and the sleeve.

It is therefore a further object of the present invention to provide a coupling for a corrugated conduit capable of increasing the effectiveness of the seal between the conduit and the sleeve.

These and other objects and advantages of the present invention will be more apparent from the following detailed description of the embodiment when taken in conjunction with the attached drawings.

DETAILED DESCRIPTION OF THE EMBODIMENT

Figure 1:
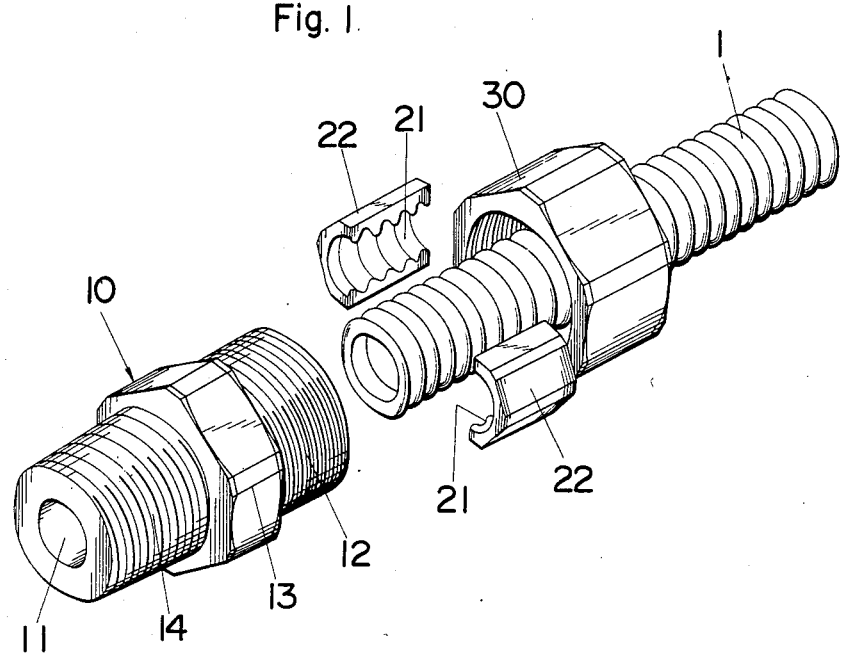
FIG. 1 is an exploded perspective view of a coupling for a corrugated conduit in accordance with a preferred embodiment of the present invention.
Figure 2:
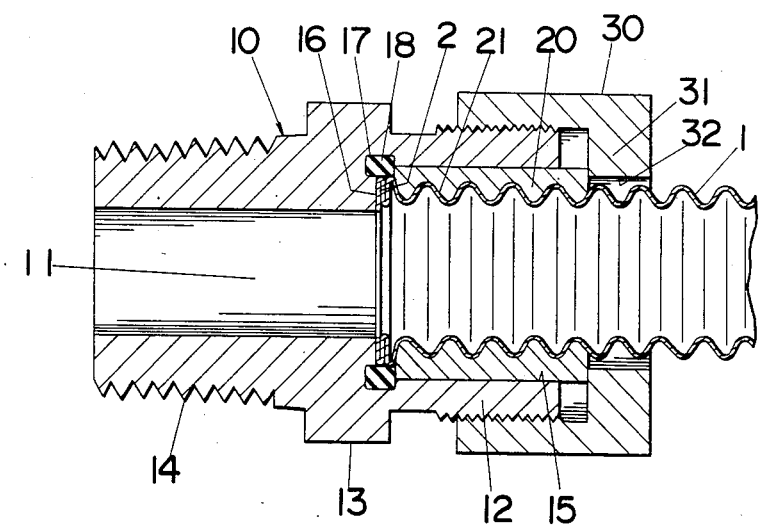
FIG. 2 is a vertical cross section of the coupling.
Figure 3:
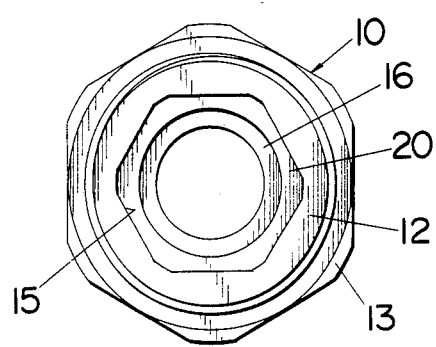
FIG. 3 is an end view of a main tubular body of the coupling.

Referring now to FIG. 1, there is shown a coupling for a corrugated conduit 1 embodying the present invention. The coupling comprises a main tubular body 10 having an axial bore 11 and having on its one end portion an externally threaded sleeve 12. The other end portion of the main tubular body 10 defines a head portion including a hexagonally shaped flange 13 and a male member 14 being in the form of an externally threaded tapered barrel and projecting outwardly from the flange 13 for connection with any suitable devices or fittings. The sleeve 12 defines therein a conduit receiving bore 15 of hexagonal configuration which has a diameter larger than the rest of the axial bore 11 and terminate at its inner end in an annular shoulder 16 projecting radially inwardly midway between the ends of the axial bore 11. The corrugated conduit 1 is made of metallic material to include a series of uniform corrugations having relatively rounded crests alternated by relatively rounded roots, as best shown in a longitudinal cross-sectional view of FIG. 2, and is relatively thin-walled to be flexible.

Figure 4:
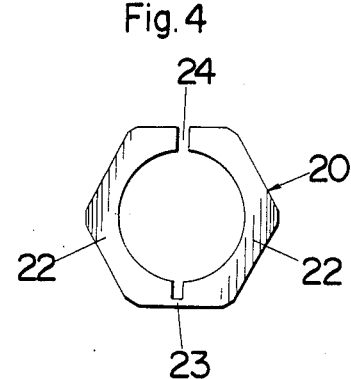
FIG. 4 is an end view of a split nipple employed in the coupling.

For connection of the corrugated conduit 1 to the main tubular body 10, the conduit 1 is inserted as being clamped by a nipple 20 into the conduit receiving bore 15 of the sleeve 12 together therewith and is secured by rotating a nut 30 threadedly engaged on the sleeve 12. The nipple 20 is shaped to have a hexagonal exterior configuration to be slidable but unrotatably inserted into the hexagonally shaped conduit receiving bore 15 of the sleeve 12. Formed internally of the nipple 20 are a series of serrations 21 which are in intimate mating or registering engagement with the corrugations of the conduit 1 to firmly grip the latter. As shown in FIG. 4, the nipple 20 is prepared in the form of a split tube composed of a pair of semicylindrical halves 22 connected by a thin-walled hinge portion 23 diametrically opposed to a slit 24 to be easily separable thereat. The nut 30 threaded on the sleeve 12 includes a radially inwardly projecting collar 31 at its rear end, the collar 31 encircling an aperture 32 which has an internal diameter larger enough for freely passing therethrough the corrugated conduit 1 but smaller than the maximum external diameter of the nipple 20 so that the collar 31 is to be in abutting engagement with the rear end of the nipple 20.

In assembling the coupling, the first step is to extend the end portion of the corrugated conduit 1 through the nut 30 and to separate the nipple 20 into two semicylindrical halves 22 by cutting the hinge portion 23, which halves 22 are then placed about the end portion of the conduit in such a manner as to leave a few row of corrugations at the extreme end of the conduit 1 to project beyond the forward end of the nipple 20 and to register the serrations 21 into mating engagement of the corrugations of the conduit 1. The end portion of the conduit 1 thus clamped by the nipple 20 is inserted together with the latter into the conduit receiving bore 15 as the hexagonally shaped nipple 20 being guided by the correspondingly shaped conduit receiving bore 15. Thereafter, the nut 30 is threaded on the sleeve 12 with the collar 31 abutting against the rear end of the nipple 20. Advancing or rotating the nut 30 presses the nipple 20 and the conduit 1 held thereby deep into the sleeve 12 to thereby force the end of the conduit 1 into pressing contact with the shoulder 16, at which occurrence the corrugations left projecting beyond the nipple 20 are collapsed between the forward end of the nipple 20 and the shoulder 16 so as to provide an effective seal around the entire periphery of the conduit end therebetween even though the end of the conduit 1 is not cut exactly square. It is to be noted at this time that since the split nipple 20 is cut into the two semicylindrical halves 22 which are symmetrical to each other they can be successfully placed about the end portion of the conduit 1 even if one of them might be reversed in its longitudinal direction at the situs of the assembling, facilitating the assembling procedures.

Formed at the juncture of the shoulder 16 and the conduit receiving bore 15 is an annular groove 17 receiving therein a sealing ring or O-ring 18 for improving the sealing effect between the shoulder 16 and the conduit end. The sealing ring 18 has an internal diameter slightly smaller than the conduit 1 in order that the collapsed end 2 of the conduit 1 is press fitted into the sealing ring 18 to elastically deform it radially outwardly when the conduit 1 is pressed against the shoulder 16. The external diameter of the sealing ring 18 is larger than the minimum external diameter of the nipple 20 so that the sealing ring 18 has its side in abutting relation to the forward end of the nipple 20. Thus, the sealing ring 18 is axially compressed by the front end of the nipple 20 to be thereby elastically deformed radially so as to provide tight sealing engagements between the sealing ring 18 and the corrugated end 2 of the conduit 1 as well as between the sealing ring 18 and the walls of the groove 17, assuring a complete seal between the conduit 1 and the sleeve 12 or the main tubular body 10. The sealing ring 18 may be of circular, rectangular or any suitable section for ensuring the above sealing effect.

Figure 5:
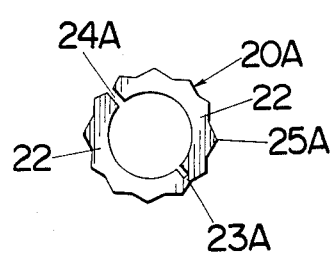
FIGS. 5 and 6 are end views respectively showing a split nipple and a main tubular body employed in a first modification of the above embodiment.
Figure 6:
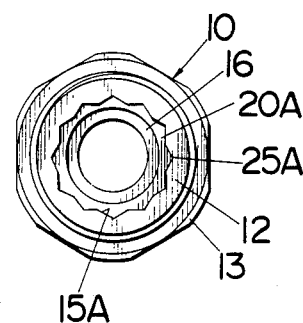
Figure 7:
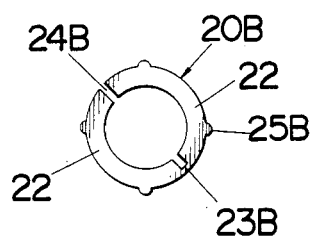
FIGS. 7 and 8 are end views respectively showing a split nipple and a main tubular body employed in a second modification of the above embodiment.
Figure 8:
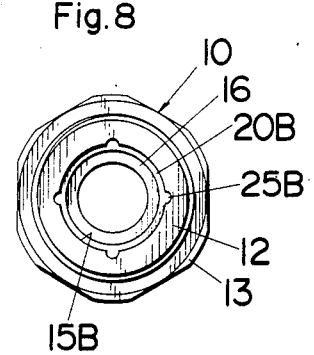

First and second modifications of the above embodiment are shown respectively in FIGS. 5 and 6 and in FIGS. 7 and 8, these modifications being identical in construction to the above embodiment except for the external configuration of the nipple 20A and 20B as well as the internal configuration of the associated conduit receiving bore 15A and 15B of the sleeve 15. For easy understanding, the like parts are designated by like numerals as in the above embodiment. In these modifications the nipples 20A and 20B are shaped to have an star-shaped cross section characterized respectively by a larger number of sharpened ribs 25A and by a smaller number of rounded ribs 25B both of which are evenly spaced circumferentially. The conduit receiving bores 15A and 15B of the modifications are correspondingly shaped, permitting the respective nipples 20A and 20B to be slidable but unrotatable within the sleeve 12. Likewise in the above embodiment, each of the nipples 20A and 20B is provided with a slit 24A, 24B and thin-walled hinge portion 23A, 23B by which it can be separated into two semicylindrical halves symmetrical to each other.

It is contemplated that still other modifications and changes can be made in the coupling disclosed without departing from the scope of the invention.

What is claimed is:

1. In a coupling for a corrugated conduit comprising:
   a main tubular body having an axial bore and a sleeve at its one end, said sleeve defining therein a conduit receiving bore terminating at its inner end in an annular shoulder projecting radially inwardly of the main tubular body midway between the ends of the axial bore;

a nipple formed on its interior surface with serrations which are in registering engagement with the corrugations at the end portion of the conduit;

wherein said nipple being shaped to have a polygonal exterior configuration to be fitted in a correspondingly shaped section of said conduit receiving bore so as to be slidably but unrotatably inserted into the conduit receiving bore of the sleeve;

a nut threaded on the sleeve, said nut having at one end of a collar which abuts against the rear end of said nipple so as to press it together with the end of the conduit held thereby against said shoulder for forcing the latter into pressing contact with the shoulder as the nut being advanced by rotation about the sleeve, said corrugations at the end of said conduit left projecting beyond the end of said nipple being collapsed between the forward end of said nipple and said shoulder;

wherein said main tubular body is provided with an annular groove at the junctions of said annular shoulder and said conduit receiving bore of said sleeve for receiving therein a sealing ring which is to be disposed around the end of said conduit left projecting beyond the forward end of said nipple when said conduit is inserted into said sleeve, said sealing ring having a side in abutting relation with the end of said nipple so that it is compressed axially by said nipple inserted in said sleeve to expand radially for establishing sealing contacts between said sealing ring and the wall of said groove as well as between said sealing ring and the end of said conduit being pressed against said shoulder.

2. The improvement according to claim 1, wherein said nipple is in the form of a split member composed of a pair of semicylindrical halves connected by an integral thin-walled hinge portion to be separable thereat and is adapted to be placed upon the end portion of the conduit with the semicylindrical halves being separated, said semicylindrical halves being symmetrical to each other.

3. The improvement according to claim 1, wherein said main tubular body is formed with an externally threaded male member on the opposite end from the sleeve for threading connection with a female coupling member.

* * * * *